(12) United States Patent
Akamine et al.

(10) Patent No.: US 8,465,720 B2
(45) Date of Patent: Jun. 18, 2013

(54) ALUMINUM OXYCARBIDE COMPOSITION AND PRODUCTION METHOD THEREFOR

(75) Inventors: Keiichiro Akamine, Fukuoka (JP); Katsumi Morikawa, Fukuoka (JP); Joki Yoshitomi, Fukuoka (JP); Yoshihiko Uchida, Fukuoka (JP)

(73) Assignee: Krosakiharima Corporation, Fukuoka (JP)

( * ) Notice: Subject to any disclaimer, the term of this patent is extended or adjusted under 35 U.S.C. 154(b) by 134 days.

(21) Appl. No.: 13/262,133

(22) PCT Filed: Mar. 30, 2010

(86) PCT No.: PCT/JP2010/055754
§ 371 (c)(1),
(2), (4) Date: Oct. 25, 2011

(87) PCT Pub. No.: WO2010/113972
PCT Pub. Date: Oct. 7, 2010

(65) Prior Publication Data
US 2012/0035384 A1  Feb. 9, 2012

(30) Foreign Application Priority Data
Mar. 30, 2009 (JP) ................. 2009-082729

(51) Int. Cl.
*C01B 31/00* (2006.01)
*C04B 35/103* (2006.01)
*C07F 5/06* (2006.01)

(52) U.S. Cl.
USPC ........... 423/415.1; 423/440; 501/87; 556/179

(58) Field of Classification Search
USPC ................. 423/415.1, 440; 501/87; 556/179
See application file for complete search history.

(56) References Cited

U.S. PATENT DOCUMENTS

| 4,341,533 A | 7/1982 | Daire et al. |
| 4,643,983 A * | 2/1987 | Zeiringer ................ 501/87 |
| 2011/0077340 A1 | 3/2011 | Shin et al. |

FOREIGN PATENT DOCUMENTS

| JP | 56009281 A | 1/1981 |
| JP | 57061708 B | 12/1982 |
| JP | 9295857 A | 11/1997 |
| JP | 9295874 A | 11/1997 |
| WO | 2009119683 A1 | 10/2009 |

OTHER PUBLICATIONS

Li et al., Adcanced Materials, vol. 17, No. 11, pp. 1401-1405 (2005).*
International Preliminary Report on Patentability published Oct. 4, 2011 for PCT/JP2010/055754 filed Mar. 30, 2010.
Written Opinion published Sep. 30, 2011 for PCT/JP2010/055754 filed Mar. 30, 2010.
Hiroshi Takasugi, Takashige Matsumoto, Hiroshikato, Junichi Tanaka, Some Studies on Al2O3-C Materials, Refractories, vol. 35 p. 316, 1983.
Jianli Zhao, Wei Lin, Akira Yamaguchi, Junji Ommyoji and Jialin Sun, Synthesis of a14O4C from Starting Raw Material of Alumina and Graphite, Refractories, vol. 59 p. 288, 2007.
International Search Report published Oct. 7, 2010 for PCT/JP2010/055754 filed Mar. 30, 2010.

* cited by examiner

*Primary Examiner* — Porfirio Nazario Gonzalez
(74) *Attorney, Agent, or Firm* — Marty Fleit; Paul D. Bianco; Fleit Gibbons Gutman Bongini Bianco PL

(57) ABSTRACT

Provided is an aluminum oxycarbide composition production method capable of increasing a yield of $Al_4O_4C$ while reducing a content rate of $Al_4C_3$ and achieving high productivity, and an aluminum oxycarbide composition. The method comprises: preparing a blend substantially consisting of a carbon-raw material having a mean particle diameter of 0.5 mm or less and an alumina-raw material having a mean particle diameter of 350 μm or less, wherein a mole ratio of the carbon-raw material to the alumina-raw material ($C/Al_2O_3$) is in a range of 0.8 to 2.0; homogeneously mixing the blend to allow a variation in C component to fall within ±10%; and melting the obtained mixture in an arc furnace at 1850° C. or more.

12 Claims, No Drawings

ALUMINUM OXYCARBIDE COMPOSITION AND PRODUCTION METHOD THEREFOR

TECHNICAL FIELD

The present invention relates to an aluminum oxycarbide composition usable as a ceramic or refractory material, or a raw material therefor, and a production method for the aluminum oxycarbide composition.

BACKGROUND ART

As an aluminum oxycarbide, the following two types: $Al_2OC$ and $Al_4O_4C$, have been known. In particular, $Al_4O_4C$ is stable at high temperatures and excellent in oxidation resistant, corrosion resistance and thermal shock resistance, so that it is expected as a refractory or ceramic material, or a raw material therefor. Especially, $Al_4O_4C$ is expected as a raw material for a carbon-containing refractory material, such as an alumina-carbon based refractory material or a magnesia-carbon based refractory material, used as a refractory material for use with molten metal such as molten iron or steel.

As a production method for $Al_4O_4C$, a sintering process of heat-treating a carbon-raw material and an alumina-raw material in a burning furnace, or a melting process of melting a carbon-raw material and an alumina-raw material in an arc furnace, are being studied, although they have not been put to practical use.

For example, as disclosed in the following Non-Patent Document 1, it has been experimentally confirmed that $Al_4O_4C$ is formed by heat-treating powdery alumina and powdery graphite in an argon atmosphere. This production method comprises: adding ethanol to alumina having a mean particle diameter of 0.1 μm and graphite reagent having a particle size of 45 μm or less; mixing them in an agate mortar; drying the obtained mixture; putting the dried mixture in powder form (2 g) into a graphite crucible; setting the crucible in an electric furnace; forming a vacuum within the electric furnace; and then burning the mixture at 1700° C. while supplying argon gas into the electric furnace.

The Non-Patent Document 1 says that, in a test carried out under conditions that a mole ratio $C/Al_2O_3$ is set to 0.5, 1.5, 2 and 3, when $C/Al_2O_3=1.5$, an amount of formation of $Al_4O_4C$ was maximized without forming $Al_2OC$ and $Al_4C_3$, and therefore the best blend ratio for synthesis of $Al_4O_4C$ is considered to be 1.5. However, it is mentioned that pure $Al_4O_4C$ free of $Al_2O_3$ and graphite was not obtained. Further, a produced composition had a particle diameter of about 10 to 100 μm.

In the production method disclosed in the Non-Patent Document 1, it is assumed that the formation of $Al_4O_4C$ from a carbon-raw material and an alumina-raw material is progressed according to chemical reactions expressed by the following Formulas (1) to (3):

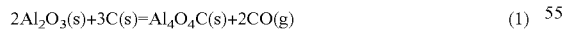  (1)

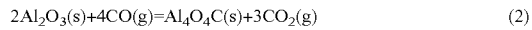  (2)

$CO(g)+C(g)=2CO(g)$  (3)

However, it is mentioned that, when $C/Al_2O_3$ becomes greater than 1.5, $Al_4C_3$ is also formed according to the following Formulas (4) and (5), and the formation of $Al_4C_3$ according to the following Formulas (4) and (5) is facilitated along with an increase in heating time.

  (4)

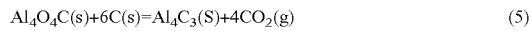  (5)

The following Patent Document 1 discloses a method of producing an aluminum oxycarbide composition using an arc furnace. In inventive examples disclosed in the Patent Document 1, various coarse grain consisting primarily of alumina-aluminum oxycarbide and having total carbon contents of 0.8 mass %, 1.11 mass %, 1.76 mass % and 2.13 mass %, respectively, are obtained by adding carbon to 100 mass parts of Bayer process alumina, in amounts of 2.5 mass parts, 5.0 mass parts, 10.0 mass parts and 12.5 mass parts, and melting the obtained mixture in an arc furnace. In a comparative example where carbon is added to 100 mass parts of Bayer process alumina, in an amount of 15 mass parts, a refractory aggregate having a total carbon content of 3.10 mass % is obtained. The Patent Document 1 says that a refractory aggregate having a total carbon content of 3.0 mass % or more is not suitable as a refractory raw material, because the aggregate is likely to form aluminum carbide ($Al_4C_3$) which easily reacts with water. It is also mentioned that, when the aggregate was applied to a refractory material, hot bending strength was significantly and undesirably deteriorated.

The Non-Patent Document 2 discloses a technique of producing an aluminum oxycarbide composition by a method similar to that in the Patent Document 1, wherein the aluminum oxycarbide composition has an apparent porosity of 0.3 to 1.2%, an apparent specific gravity of 3.24 to 3.87, and an carbon content rate of 0.83 to 3.14 mass %. It is mentioned that a sample prepared in the Non-Patent Document 2 contains $Al_4C_3$, because it can react with water to generate methane gas.

The following Patent Document 2 discloses a carbon-containing brick containing aluminum oxycarbide, and the following Patent Document 3 discloses a monolithic refractory material containing aluminum oxycarbide. In the Patent Documents 2 and 3, it is mentioned that aluminum oxycarbide is produced by heating a mixture of alumina and carbon under an argon atmosphere or the like at 1400° C. or more.

LIST OF PRIOR ART DOCUMENTS

[Patent Documents]

Patent Document 1: JP 57-061708B

Patent Document 2: JP 09-295857A

Patent Document 3: JP 09-295874A

[NON-PATENT DOCUMENTS]

Non-Patent Document 1: REFRACTORIES, Vol. 59, p 288, 2007

Non-Patent Document 2: REFRACTORIES, Vol. 35, p 316, 1983

SUMMARY OF THE INVENTION

Problem to be Solved by the Invention

In the production method disclosed in the Non-Patent Document 1, the produced composition is in the form of a powder having a particle diameter of 10 to 100 μm. In other words, this method is incapable of producing a dense and high-strength composition. This causes a problem that versatility as a raw material for refractory materials is limited. Specifically, the composition cannot be use as a raw material for a course particle fraction having a particle diameter, for example, of 1 mm or more, so that it is impossible to sufficiently bring out advantageous effects of $Al_4O_4C$, i.e., low thermal expansion coefficient and excellent corrosion resistance. Moreover, the production under an argon atmosphere involves a problem of poor productivity.

In the production method disclosed in the Patent Document 1, a refractory aggregate having a total carbon content of 3.0 mass % or more is not suitable as a refractory raw material, because it is likely to form $Al_4C_3$ which easily reacts with water. This means that the production method disclosed in the Patent Document 1 has a problem that $Al_4C_3$ is formed as a by-product.

In the production method disclosed in the Non-Patent Document 2, $Al_4C_3$ is also formed as a by-product. Moreover, although a theoretical formation rate of $Al_4O_4C$ to be calculated from a rate of raw materials used therein is 100%, it is actually 57% as calculated from C component of the sample A-7 in the Table. Thus, there is another problem of low yield of $Al_4O_4C$.

Even if $Al_4C_3$ is contained in a refractory material only in a small amount, it forms $Al(OH)_3$ through a hydration reaction, called "slaking", which gives rise to a phenomenon that a microstructure of the refractory material breaks up. Thus, in cases where the composition in the Non-Patent Document 2 is used as a raw material for a refractory material, a microstructure of the refractory material becomes brittle due to cracks, which causes a problem of significantly lowed strength. Specifically, there is a problem that $Al_4C_3$ develops a hydration reaction with moisture in the air during storage of the refractory material, and thereby cracks occur in the refractory material, resulting in deterioration of durability. Particularly, it is often the case that a refractory brick is stored in the air for several months, i.e., is placed in an environment where $Al_4C_3$ is more likely to undergo slaking, i.e., react with moisture in the air, for a long period of time. Moreover, the composition in the Non-Patent Document 2 cannot be used for a monolithic refractory material necessary to use water.

Production methods disclosed in the Patent Documents 2 and 3 are based on a sintering process as with the production methods disclosed in the Non-Patent Document 1, so that thee is a problem that a raw material having a dense microstructure and a large particle size cannot be obtained.

It is therefore an object of the present invention to provide an aluminum oxycarbide composition production method capable of increasing a yield of $Al_4O_4C$ while reducing a content rate of $Al_4C_3$ and achieving high productivity, and an aluminum oxycarbide composition.

It is difficult to isolate $Al_4O_4C$ from a carbon-raw material and an alumina-raw material used as raw materials in the production method of the present invention, or $Al_2OC$, etc, as by-products thereof. Thus, in this specification, a material produced by the production method of the present invention will be referred to as "aluminum oxycarbide composition".

Means for Solving the Problem

Generally, in cases where a blend of raw materials is melted in an arc furnace, it is not necessary to homogeneously mix the raw materials in advance. This is because the raw materials are melted and fluidified in the arc furnace, and a strong convection occurs in the arc furnace due to heating by an electrode, so that it is possible to obtain a sufficient stirring effect. However, through various researches for increasing the yield of $Al_4O_4C$ while suppressing formation of $Al_4C_3$, during production of $Al_4O_4C$ in an arc furnace, the inventor of the present invention has found that it is extremely effective to homogeneously mix raw materials used for the production.

As for $Al_4O_4C$, it is considered that a carbon-raw material and an alumina-raw material are melted while reacting with each other in accordance, primarily, with the following chemical reaction formula: $2Al_2O_3+3C=Al_4O_4C+2CO$ (Formula (1)). In other words, it is assumed that a reaction between the carbon-raw material and the alumina-raw material occurs even before the melting. The stirring effect based on the melting cannot be expected during the pre-melting reaction. In addition, an unreacted part of the carbon-raw material reacts with formed $Al_4O_4C$ to form $Al_4C_3$. Further, the carbon-raw material and the alumina-raw material are largely different in specific gravity, and thereby it is quite difficult to homogeneously mix them. Therefore, the preliminary homogeneous mixing is extremely effective in increasing the yield of $Al_4O_4C$ while suppressing the formation of $Al_4C_3$.

As used in this specification, the term "homogeneously mixing (homogeneous mixing)" means a state in which variation is significantly reduced when the mixture is sampled. In this specification, an index of the homogeneous mixing is represented by a variation in C component. The term "variation in C component" means a ratio (%) of a difference between a specific one of a plurality of analysis values, and a preset target value of the C component, to the preset target value, wherein the plurality of analysis values are obtained by taking a sample three times from a mixture of the carbon-raw material and the alumina-raw material, and analyzing respective C components of the sampled mixtures, and the specific analysis value has the largest difference with the preset target value. In the present invention, the variation in C component is set to fall within ±10%, preferably within ±5%. In order to achieve the homogeneous mixing, it is preferable to perform mixing using a commercially available powder mixer. The term "preset target value (%)" means (a ratio (%) of the carbon-raw material to the blend)×(a content rate (%) of C component in the carbon-raw material), wherein the content rate (%) of the C component in the carbon-raw material is a measurement value before the mixing.

The blend is prepared using fine raw material particles, so that the raw material particles can be homogeneously dispersed. This allows the carbon-raw material and the alumina-raw material to efficiently react with each other in the arc furnace, which makes it possible to obtain an aluminum oxycarbide having a high content rate of $Al_4O_4C$ and containing almost no $Al_4C_3$.

Specifically, an aluminum oxycarbide composition production method of the present invention comprises: preparing a blend substantially consisting of a carbon-raw material having a mean particle diameter of 0.5 mm or less and an alumina-raw material having a mean particle diameter of 350 µm or less, wherein a mole ratio of the carbon-raw material to the alumina-raw material ($C/Al_2O_3$) is in a range of 0.8 to 2.0; homogeneously mixing the blend to allow a variation in C component to fall within ±10%; and melting the obtained mixture in an arc furnace at 1850° C. or more.

As above, in the present invention, in order to increase the yield of $Al_4O_4C$ while suppressing the formation of $Al_4C_3$, the mean particle diameter of the carbon-raw material is set to 0.5 mm or less, preferably, 200 µm or less. If the mean particle diameter is greater than 0.5 mm, a homogeneous reaction with the alumina-raw material is less likely to occur, which causes a reduction in yield of $Al_4O_4C$, and an increase in formation of $Al_4C_3$. Preferably, a lower limit of the mean particle diameter of the carbon-raw material is set to 0.5 µm. If the mean particle diameter of the carbon-raw material is less than 0.5 µm, fine particles of the carbon-raw material in the blend are kicked up during production, due to shock caused by electric discharge, etc., and generation of CO gas in the course of formation of $Al_4O_4C$. This worsens working environment. Moreover, if dust-collecting equipment, air ventilating equipment or the like, is provided as working environment measures, a blend ratio of the carbon- raw material will be changed, which is likely to cause a reduction in yield of $Al_4O_4C$.

A particle size of the alumina-raw material is set to 350 μm or less, preferably, 60 μm or less, in terms of a mean particle diameter. If the mean particle diameter is greater than 350 μm, a homogeneous reaction with the carbon- raw material is less likely to occur, which causes a reduction in yield of $Al_4O_4C$, and an increase in formation of $Al_4C_3$. Preferably, a lower limit of the mean particle diameter of the alumina- raw material is set to 0.5 μm. If the mean particle diameter of the alumina-raw material is less than 0.5 μm, fine particles of the alumina-raw material are kicked up during production, due to shock caused by electric discharge, etc., and generation of CO gas in the course of formation of $Al_4O_4C$ based on a reaction between $Al_2O_3$ and C. This worsens working environment. Moreover, if dust-collecting equipment, air ventilating equipment or the like, is provided as working environment measures, a blend ratio of the alumina-raw material will be changed. Thus, if the amount of the carbon-raw material becomes excessive, the formation of $Al_4C_3$ is likely to occur.

As used in this specification, the term "mean particle diameter" is a median size which means a particle diameter at a mass percentage of 50% in a mass cumulative graph representing a result of particle diameter measurement. The particle diameter measurement may be performed, for example, by sieving or laser diffractometry. As used in this specification, the term "mesh" as a unit of particle size means an opening size of each Tyler standard sieve. For example, the term "100 mesh or less" means sizes of particles which pass through the Tyler standard sieve 100 Mesh.

In the present invention, a blend substantially consists of a carbon-raw material having a mean particle diameter of 0.5 mm or less and an alumina- raw material having a mean particle diameter of 350 μm or less. The term "substantially" here means that a raw material other than the carbon- raw material and the alumina- raw material may be used in combination according to need as long as it does not have any adverse effect on the yield of $Al_4O_4C$, or that a binder may be used when the blend is preliminarily pelletized. However, it is preferable that the carbon-raw material having a mean particle diameter of 0.5 mm or less and the alumina-raw material having a mean particle diameter of 350 μm or less are included in the blend in a total amount of 95 mass % or more.

The carbon-raw material and the alumina-raw material are blended such that a mole ratio of the carbon-raw material to the alumina-raw material ($C/Al_2O_3$) is in a range of 0.8 to 2.0. If the mole ratio of the carbon- raw material to the alumina-raw material is less than 0.8, the yield of $Al_4O_4C$ becomes excessively low. If the mole ratio is greater than 2.0, the formation of $Al_4C_3$ is more likely to occur. Further, in order to obtain an aluminum oxycarbide composition having a high content rate of $Al_4O_4C$, it is preferable that the mole ratio of the carbon-raw material to the alumina-raw material ($C/Al_2O_3$) is set in a range of 1.0 to 1.8.

Then, the blend of the carbon-raw material and the alumina-raw material is homogeneously mixed and melted in an arc furnace. In this manner, an aluminum oxycarbide composition having a high content rate of $Al_4O_4C$ and a low content rate of $Al_4C_3$ can be obtained. A melting temperature in the arc furnace is set to 1850° C. or more which is greater than a melting point of the $Al_4O_4C$.

In addition to the above production method, the present invention further provides an aluminum oxycarbide composition produced using an arc furnace. The aluminum oxycarbide composition has a chemical composition consisting of: 95 mass % or more of a total of C and $Al_2O_3$; 45 mass % or more of $Al_4O_4C$ as a mineral phase; and 10 mass % or less of other mineral phase, with the remainder being corundum. The aluminum oxycarbide composition has a degradation rate of 3 mass % or less as measured in a magnesia clinker slaking test according to the Gakushin-method 4.

The aluminum oxycarbide composition of the present invention is produced by melting a starting raw material in an arc furnace. As the starting material, a carbon-raw material and an alumina-raw material may be used. A resulting composition contains a mineral phase primarily comprising $Al_4O_4C$ and corundum, and has a chemical composition including 95 mass % or more of a total of C and $Al_2O_3$. As the chemical composition, although it is desirable to set the total amount of C and $Al_2O_3$ to a higher value so as to obtain a higher content rate of $Al_4O_4C$, impurities due to the starting raw material may be included in an amount of less than 5 mass %.

In the aluminum oxycarbide composition of the present invention, it is desirable to set the content rate of $Al_4O_4C$ to a higher value. The content rate of $Al_4O_4C$ is at least 45 mass %, preferably, 70 mass % or more. If the content rate is less than 45 mass %, for example, in cases where the aluminum oxycarbide composition is used as a refractory material, an amount of the aluminum oxycarbide composition to be added will be inevitably increased. Thus, depending on types of target refractory materials, a content rate of corundum as the remainder is increased, so that the refractory material has a higher thermal expansion coefficient and a lower oxidation resistance, resulting in limit to versatility of the aluminum oxycarbide composition. Most of the corundum as the remainder is a melt of the alumina-raw material used as the starting material.

The "other mineral phase" is a mineral phase, for example, $Al_4C_3$, graphite, Al, $Al_2OC$, AlON, and impurities in the starting material. Although it is desirable to minimize the "other mineral phase", the "other mineral phase" may be contained in a total amount of 10 mass % or less, preferably, 2 mass % or less, to allow the aluminum oxycarbide composition to be used as a raw material for refractory materials, without any problem.

It is also assumed that a small amount of $Al_4C_3$ is contained in the aluminum oxycarbide composition, as a by-product. However, $Al_4C_3$ originally has a small peak in X-ray diffractometry, and thereby it is difficult to defect a small amount of $Al_4C_3$. For this reason, an amount of $Al_4C_3$ is detected as a degradation rate as measured in a magnesia clinker slaking test. When the degradation rate as measured in the magnesia clinker slaking test is 3 mass % or less, preferably, 1 mass % or less, the aluminum oxycarbide composition is considered to be at a level usable as a raw material for refractory materials. If the degradation rate is greater than 3 mass %, a problem, such as cracks in cases where the aluminum oxycarbide composition is used as a refractory material, is more likely to occur. An upper limit of the degradation rate is set using the plate brick slaking test disclosed in WO 2009/119683A1 as one reference.

The aluminum oxycarbide composition of the present invention is melted once, so that it has a dense microstructure having an extremely low porosity. In particular, the aluminum oxycarbide composition preferably has an apparent porosity of 3.5% or less. If the apparent porosity is greater than 3.5%, for example, in cases where the aluminum oxycarbide composition is used as a raw material for refractory materials, deterioration in corrosion resistance, or deterioration in strength and abrasion resistance, is likely to occur.

The aluminum oxycarbide composition of the present invention has a high content rate of $Al_4O_4C$, and thereby an apparent specific gravity becomes smaller. In particular, the aluminum oxycarbide composition preferably has an apparent specific gravity of 3.20 or less. In a situation where the apparent specific gravity is greater than 3.20, corundum is contained in a relatively large amount, so that the effects of $Al_4O_4C$ are impaired.

In the aluminum oxycarbide composition of the present invention, a content rate of carbon is preferably in a range of 2.5 to 5.5 mass %, more preferably in a range of 3.2 to 5.5 mass %. If the content rate of carbon is less than 2.5 mass %, the content rate of $Al_4O_4C$ becomes smaller, and the content rate of corundum as the remainder becomes excessively large, so that the oxidation resistant, corrosion resistance and thermal shock resistance become insufficient. If the content rate of carbon is greater than 5.5 mass %, $Al_4C_3$ is contained, and thereby deterioration in slaking resistance will occur.

The aluminum oxycarbide composition of the present invention has a high content rate of $Al_4O_4C$ and contains almost no $Al_4C_3$, so that it can be suitably used as a raw material for carbon-containing refractory materials. For example, the carbon-containing refractory materials may include a magnesia carbon brick, an alumina carbon brick, a taphole mix, a casting material, and a spraying material.

The aluminum oxycarbide composition of the present invention can be obtained by the production method of the present invention.

Effect of the Invention

The production method of the present invention makes it possible to obtain an aluminum oxycarbide composition having a high content rate of $Al_4O_4C$ and a low content rate of $Al_4C_3$. In addition, the production method of the present invention employs a melting process using an arc furnace, so that it becomes possible to perform mass production at low cost with high productivity, and arbitrarily adjust a particle size of the aluminum oxycarbide composition by adjusting conditions for pulverization after the melting. This makes it possible to significantly improve durability of a carbon-containing refractory material.

The aluminum oxycarbide composition of the present invention contains $Al_4O_4C$ at a high rate of 45 mass % or more, almost without containing $Al_4C_3$, i.e., without a problem of slaking, so that it can be suitably used as a ceramic or refractory material, or as a raw material therefor. In addition, the aluminum oxycarbide composition of the present invention can be obtained by a melting process using an arc furnace, so that it becomes possible to obtain a massive aluminum oxycarbide composition having a dense microstructure, differently from an aluminum oxycarbide composition obtained by a sintering process.

DESCRIPTION OF EMBODIMENTS

A carbon-raw material for use in the present invention may be one or more selected from the group consisting of pitch, graphite, coke, carbon black and powdered organic resin, each of which is commonly used as a raw material for refractory materials. Among them, as graphite, it is possible to use one or more selected from the group consisting of flaky graphite, earthy (amorphous) graphite, expanded graphite and artificial graphite. A content rate of carbon (C content rate) of the carbon-raw material may be 90 mass % or more, preferably, 95 mass % or more.

An alumina-raw material for use in the present invention may be one or more selected from the group consisting of fused alumina, sintered alumina and calcinated alumina, each of which is prepared by artificially refining natural bauxite or the like through a Bayer process or the like, to allow an $Al_2O_3$ purity to become 95 mass % or more. Further, it is possible to use China bauxite, bauxite, clay and/or brick dust to an extent that an $Al_2O_3$ purity in the entire alumina-raw material is preferably 90 mass % or more, more preferably, 95 mass % or more.

The carbon-raw material and the alumina-raw material are weighted and blended at a given ratio, and the blend is homogeneously mixed before being put in an arc furnace. The mixing may be performed using a mixer which is commonly used to mix a powder such as a monolithic refractory material. For example, it is possible to use a ball mill, a Henschel mixer, a blade mixer, a Nauta mixer or a V-Cone mixer. In order to homogeneously mix the blend of the carbon-raw material and the alumina-raw material, it is preferable to mix the blend by a mixer for 1 minute or more.

After the mixing or during the mixing, the blend may be subjected to pelletization (size enlargement). The pelletization has an effect of enhancing efficiency of electric discharge in the arc furnace and preventing dust generation. Preferably, the pelletization is performed to allow the blend to have a mean particle diameter of 0.1 to 5 mm. Further, the mixture may be formed into a rough block having a given size so as to prevent dust generation during melting. The blend may be subjected to pulverization during the mixing, or may be simultaneously subjected to pulverization and pelletization during the mixing.

As the arc furnace, it is possible to use a type which is commonly used to melt magnesia, alumina or the like so as to produce a refractory material. In the arc furnace, the mixture of the carbon-raw material and the alumina-raw material is melted. Specifically, the mixture is melted at a temperature of about 1850 to 2400° C. After the melting, the molten mixture is cooled and pulverized to obtain an aluminum oxycarbide composition.

The aluminum oxycarbide composition of the present invention is produced by a melting process using an arc furnace, for example, in the above production method.

In the aluminum oxycarbide composition production method of the present invention, a mole ratio of the carbon-raw material to the alumina-raw material ($C/Al_2O_3$) is controlled in a range of 0.8 to 2.0 to allow a content rate of $Al_4O_4C$ to be controlled. When the mole ratio ($C/Al_2O_3$) is set in a range of 1.5 to 2.0, the content rate of $Al_4O_4C$ is maximized, and simultaneously an apparent specific gravity is minimized Further, a starting raw material is prepared to have a small particle size, and homogeneously mixed, so that formation of $Al_4C_3$ can be suppressed to increase a yield of $Al_4O_4C$, and a dense microstructure can be obtained to reduce an apparent porosity.

In the aluminum oxycarbide composition obtained in the above manner, $Al_4O_4C$ and $Al_2O_3$ (corundum) are observed as a mineral phase in X-ray diffractometry, and $Al_2O_3$ and C are detected in chemical composition analysis.

The aluminum oxycarbide composition of the present invention contents $Al_4O_4C$ at a high rate almost without containing $Al_4C_3$, i.e., without a problem of slaking, so that it can be suitably used as a ceramic or refractory material, or as a raw material therefor. Particularly, the aluminum oxycarbide composition of the present invention may be used for a carbon-containing refractor material. In this case, it becomes possible to improve oxidation resistant, corrosion resistance and thermal shock resistance.

Resistance to slaking due to a hydration reaction is evaluated by a magnesia clinker slaking test described in the Gakushin-method 4. Specifically, 50 g of an aluminum oxycarbide composition having adjusted to have a particle size of 1 mm to 3.36 mm is put in a 100 mL beaker, and the beaker is placed within an autoclave under a condition that it is covered by a watch glass so as to prevent water droplets from entering into the sample. Then, the sample is heated, and, after an internal pressure of the autoclave reaches 5 atm (152° C.), held in the state for 3 hours. Then, the dried sample is subjected to sieving using 1 mm sieve to measure a degradation rate using the following formula:

Degradation rate (%)=[(pre-test mass of sample)−(post-test mass of oversize fraction of sample, on sieve with 1 mm opening)]/pre-test mass of sample×100

The content rate of $Al_4O_4C$ in the aluminum oxycarbide composition of the present invention can be calculated according to the following calculation method.

It is assumed that C to be measured through the chemical composition analysis for the aluminum oxycarbide composition obtained by the production method of the present invention includes C components of $Al_4O_4C$, $Al_2OC$, $Al_4C_3$ and free carbon. Among them, the C component of free carbon is actually seldom or never detected. This would be because the C component of free carbon is changed to $Al_4O_4C$, $Al_2OC$ or $Al_4C_3$ through reaction during production.

If a content rate of $Al_2OC$, Al or $Al_4C_3$ is 1 mass % or less, it is difficult to detect it by X-ray analysis. Further, Al and $Al_4C_3$ have slaking properties. Thus, when Al and $Al_4C_3$ are not detected in an aluminum oxycarbide composition by X-ray analysis, and a degradation rate of the aluminum oxycarbide composition detected by the slaking test is 3 mass % or less, it is deemed that Al and $Al_4C_3$ are not contained in the aluminum oxycarbide composition. In $Al_4O_4C$, 5.56 mass % of C and 94.4 mass % of $Al_2O_3$ are measured as chemical composition analysis values. Thus, on an assumption that $Al_4O_4C$ is contained in an amount of 100 mass % when C is measured as 5.56 mass %, the content rate of $Al_4O_4C$ is calculated from a C component analysis value of an aluminum oxycarbide composition. Further, a content of $Al_4O_4C$ and a content of corundum which is substantially an $Al_2O_3$ component, can also be quantified by an internal reference method based on X-ray diffractometry.

EXAMPLES

Table 1 illustrates a verification result of an influence of the preliminary mixing of the blend before being put into the arc furnace, on the yield (content rate) of $Al_4O_4C$.

Calcinated alumina and flaky graphite were weighted by a total amount of 10 kg and blended at a ratio illustrated in Table 1. Then, the blend was mixed in a manner illustrated in Table 1. The obtained mixture was put into an arc furnace and melted at about 2000° C. to produce an aluminum oxycarbide composition. After cooling, a measurement sample was cut out from the massive aluminum oxycarbide composition, or was obtained by pulverizing the massive aluminum oxycarbide composition, to measure physical properties and chemical properties.

As for purity of each raw material used in inventive samples and comparative samples, calcinated alumina, fused alumina, artificial graphite, flaky graphite, pitch, carbon black, and earthy graphite, were 99.9 mass % in terms of $Al_2O_3$, 99 mass % or more in terms of $Al_2O_3$, 99 mass % or more in terms of C, 99 mass % or more in terms of C, 99 mass % or more in terms of C, 99.9 mass % in terms of C, and 95 mass % or more in terms of C, respectively.

In order to evaluate homogeneity of the mixture, a variation in C component of the mixture was checked. The variation in C component is a ratio (%) of a difference between a specific one of a plurality of analysis values, and a preset target value of the C component, to the preset target value, wherein the plurality of analysis values are obtained by taking a sample three times from the mixture and analyzing respective C components of the sampled mixtures, and the specific analysis value has the largest difference with the preset target value, as mentioned above. Specifically, Variation in C component=(preset target value of C component−specific analysis value having largest difference with preset target value of C component)/preset target value of C component×100. For example, in the inventive sample 1, the preset target value of the C component was 14.99 mass %, whereas C components in the result of analysis on the three sampled mixtures were 15.05 mass %, 15.04 mass % and 14.93 mass %. Thus, the variation in C component is calculated as follows: (14.99−14.93)/14.99×100=0.40%.

The apparent porosity and the apparent specific gravity were measured according to JIS-R2205. The chemical composition was measured according to JIS-R2212 and JIS-R2216.

As for the mineral phases, if a content rate of $Al_2OC$, Al or $Al_4C_3$ is 1 mass % or less, it is difficult to detect it by X-ray analysis. Therefore, their contents were calculated based on chemical composition analysis values. Specifically, on an assumption that the entire C component in the chemical composition analysis comes from $Al_4O_4C$, an amount of $Al_4O_4C$ was calculated. Further, corundum was calculated on an assumption that a remaining part other than $Al_4O_4C$ is corundum. For example, when the C component is 3 mass %, $Al_4O_4C$ is calculated as 3.0/5.56×100=54.0 (mass %), and corundum is calculated as 100−54.0=46.0 (mass %).

As for the slaking resistance, a sample having a degradation rate of 3 mass % or less as measured in the magnesia clinker slaking test according to the Gakushin-method 4 was evaluated as GOOD (o), and a sample having a degradation rate of greater than 3 mass % was evaluated as BAD (x).

Further, as for a composition produced after the melting in the arc furnace, a mineral phase was identified by X-ray diffractometry. As a result, a major mineral phase was $Al_4O_4C$, and $Al_2O_3$ (corundum). Respective content of $Al_4O_4C$ and $Al_2O_3$ (corundum) were quantified by an internal reference method based on X-ray diffractometry.

The inventive samples 1 to 3 were subjected to mixing using a V-Cone mixer for a given period of time. Table 1 shows that, as a mixing time becomes linger, the carbon-raw material and the alumina-raw material more homogeneously reacts with each other to reduce a content rate of corundum. Table 1 also shows that, as the mixture is more homogeneously mixed, the apparent specific gravity becomes smaller and the content rate of C component becomes larger.

On the other hand, due to insufficient mixing, the comparative sample 1 has a low yield (content rate) of $Al_4O_4C$, and poor slaking resistance. The comparative sample 2 which is not subjected to mixing has a lower yield (content rate) of $Al_4O_4C$. Moreover, it is assumed that a large amount of $Al_4C_3$ is formed, and slaking resistance is actually deteriorated.

Table 2 illustrates a verification result of an influence of respective particle sizes of the carbon-raw material and the alumina-raw material, on slaking resistance and the yield (content rate) of $Al_4O_4C$. The mixing of the carbon-raw material and the alumina-raw material was performed in the same manner as that in the inventive sample 1 illustrated in Table 1.

Aftermentioned samples illustrated in Tables 3 and 4 were also subjected to mixing in the same manner.

In the inventive samples 4 to 6, a particle size of a carbon-raw material (flaky graphite) is changed within the range of the present invention. Table 2 shows that, as the particle size of the carbon-raw material (flaky graphite) becomes smaller, it become possible to obtain an aluminum oxycarbide composition having a higher content rate of $Al_4O_4C$. On the other hand, in the comparative samples 3 to 5, a particle size of a carbon-raw material (artificial graphite) is beyond the range of the present invention. As a result, the content rate of $Al_4O_4C$ is relatively reduced, and the slaking resistance becomes insufficient due to a negative effect of the formation of $Al_4C_3$. Further, it was found that, as the particle size of the carbon-raw material becomes larger, the content rate of $Al_4O_4C$ tends to be reduced. Thus, it is assumed that, when the particle size of the carbon-raw material becomes larger, a contact area with the alumina-raw material becomes smaller, which causes deterioration in reactivity and occurrence of variation in carbon concentration within the mixture, and thereby $Al_4C_3$ is formed in a region having an excessively high carbon concentration.

In the inventive samples 6 to 8, a particle size of fused alumina is changed within the range of the present invention. Table 2 shows that, as the particle size of the fused alumina becomes smaller, it become possible to obtain an aluminum oxycarbide composition having a higher content rate of $Al_4O_4C$. On the other hand, in the comparative samples 6 to 8, the particle size of fused alumina is beyond the range of the present invention. As a result, the content rate of $Al_4O_4C$ is relatively reduced, and the slaking resistance becomes insufficient. Further, it was found that, as the particle size of the fused alumina becomes larger, the content rate of $Al_4O_4C$ tends to be reduced. Thus, as in the carbon-raw material, it is assumed that, when the particle size of the aluminum—raw material becomes larger, a contact area with the carbon-raw material becomes smaller, which causes occurrence of variation in alumina concentration within the mixture, and thereby $Al_4C_3$ is formed in a region having an excessively high carbon concentration.

In the inventive samples 9 to 12 in Table 3, the mole ratio of the carbon-raw material to the alumina-raw material ($C/Al_2O_3$) is changed. Each of the inventive samples 9 to 12 has a high yield of $Al_4O_4C$, and excellent slaking resistance. However, considering the application to a refractory material, the inventive samples 10 to 12 are more preferable. In the comparative sample 9, the mole ratio is set to a low value of 0.4, and therefore an amount of formed $Al_4O_4C$ is small.

The inventive samples 13 to 18 in Table 4 are examples in which various raw materials are used as the carbon-raw material and the alumina-raw material. In each of inventive samples 13 to 18, an aluminum oxycarbide composition having excellent slaking resistance could be obtained. Carbon black used in the inventive sample 15 is a most fine carbon-raw material. However, the extremely fine carbon-raw material is oxidized by oxygen in the air, so that an amount of formed $Al_4C_3$ (corundum) is increased.

In the inventive samples 7 and 18 in Table 4, an aluminum oxycarbide composition prepared by mixing fused alumina having a particle size of 100 mesh and flaky graphite having a particle size of 100 mesh by a V-Cone mixer for 5 minutes (inventive sample 7) was compared with an aluminum oxycarbide composition prepared by, after the mixing, adding an aqueous organic solvent to the mixture, and pelletizing it using a high-speed mixer (inventive sample 18). Table 4 shows that the pelletization makes it possible to improve reactivity between the carbon-raw material and the alumina-raw material, and therefore increase the yield of $Al_4O_4C$.

TABLE 1
TABLE 2
TABLE 3
TABLE 4

TABLE 1

| | Name | Particle size | Mean particle diameter | Inventive sample 1 | Inventive sample 2 | Inventive sample 3 | Comparative sample 1 | Comparative sample 2 |
|---|---|---|---|---|---|---|---|---|
| Raw material | Calcinated alumina | | 50 μm | 85 | 85 | 85 | 85 | 85 |
| | Flaky graphite | 200 mesh | 60 μm | 15 | 15 | 15 | 15 | 15 |
| | Mol ratio between mixed raw materials (C/Al2O3) | | | 1.5 | 1.5 | 1.5 | 1.5 | 1.5 |
| | Mixing method | | | Mixing by V-Cone mixer for 5 min | Mixing by V-Cone mixer for 3 min | Mixing by V-Cone mixer for 1 min | Manual mixing in bag for 1 min | Non-mixing |
| | Variation in C component of mixture (%) | | | 0.40 | 1.1 | 1.5 | 12 | 21 |
| Compositon produced after melting in arc furnace | | | | | | | | |
| Properties of refractory composition | Apparent specific gravity | | | 2.84 | 2.85 | 2.86 | 3.22 | 3.27 |
| | Apparent porosity (%) | | | 2.1 | 2.2 | 2.4 | 3.1 | 3.3 |
| Chemical composition (mass %) | $Al_2O_3$ | | | 95.1 | 95.2 | 95.3 | 96.5 | 97.3 |
| | C | | | 4.9 | 4.8 | 4.7 | 3.5 | 2.7 |
| | Slaking resistance | | | ○ | ○ | ○ | x | x |
| Mineral phase (mass %) | $Al_4O_4C$ | | | 88.2 | 86.4 | 84.6 | 63.0 | 48.6 |
| | Corundum | | | 11.8 | 13.6 | 15.4 | 37.0 | 51.4 |

TABLE 2

| | Name | Particle size | Mean particle diameter | Inventive sample 4 | Inventive sample 5 | Inventive sample 6 | Inventive sample 7 | Inventive sample 8 | Comparative sample 3 |
|---|---|---|---|---|---|---|---|---|---|
| Raw material | Fused alumina | 5~3 mm | 3.3 mm | | | | | | |
| | | 3~1 mm | 1.7 mm | | | | | | |
| | | 1~0.5 mm | 0.6 mm | | | | | | |
| | | 0.5 mm or less | 350 μm | 85 | 85 | 85 | | | |

TABLE 2-continued

| Name | Particle size | Mean particle diameter | | | | | |
|---|---|---|---|---|---|---|---|
| | 100 mesh or less | 60 μm | | | | 85 | | 85 |
| | 325 mesh or less | 15 μm | | | | | 85 | |
| Artificial graphite | 8~3 mm | 4.5 mm | | | | | | 15 |
| | 3~1 mm | 1.2 mm | | | | | | |
| | 2~1 mm | 0.7 mm | | | | | | |
| Flaky graphite | 50 mesh or more | 0.5 mm | 15 | | | | | |
| | 100 mesh or more | 0.2 mm | | 15 | | 15 | 15 | |
| | 325 mesh or less | 3 μm | | | 15 | | | |
| Composition produced after melting in arc furnace | | | | | | | | |
| Apparent specific gravity | | | 3.02 | 2.92 | 2.83 | 2.99 | 2.76 | 3.25 |
| Apparent porosity (%) | | | 2.5 | 2.4 | 2.0 | 2.3 | 2.1 | 3.0 |
| Chemical composition (mass %) | $Al_2O_3$ | | 95.8 | 95.4 | 95.0 | 94.9 | 94.8 | 96.7 |
| | C | | 3.9 | 4.3 | 4.7 | 4.8 | 4.9 | 3.0 |
| Slaking resistance | | | ○ | ○ | ○ | ○ | ○ | x |
| Mineral phase (mass %) | $Al_4O_4C$ | | 70.2 | 77.4 | 84.6 | 56.4 | 88.2 | 54.0 |
| | Corundum | | 29.8 | 22.6 | 15.4 | 13.5 | 11.8 | 45.0 |

| | Name | Particle size | Mean particle diameter | Comparative sample 4 | Comparative sample 5 | Comparative sample 6 | Comparative sample 7 | Comparative sample 8 |
|---|---|---|---|---|---|---|---|---|
| Raw material | Fused alumina | 5~3 mm | 3.3 mm | | | 85 | | |
| | | 3~1 mm | 1.7 mm | | | | 85 | |
| | | 1~0.5 mm | 0.6 mm | | | | | 85 |
| | | 0.5 mm or less | 350 μm | | | | | |
| | | 100 mesh or less | 60 μm | 85 | 85 | | | |
| | | 325 mesh or less | 15 μm | | | | | |
| | Artificial graphite | 8~3 mm | 4.5 mm | | | | | |
| | | 3~1 mm | 1.2 mm | 15 | | | | |
| | | 2~1 mm | 0.7 mm | | 15 | | | |
| | Flaky graphite | 50 mesh or more | 0.5 mm | | | | | |
| | | 100 mesh or more | 0.2 mm | | | 15 | 15 | 15 |
| | | 325 mesh or less | 3 μm | | | | | |
| Composition produced after melting in arc furnace | | | | | | | | |
| | Apparent specific gravity | | | 3.21 | 3.18 | 3.30 | 3.24 | 3.19 |
| | Apparent porosity (%) | | | 3.2 | 2.5 | 3.1 | 3.4 | 2.9 |
| | Chemical composition (mass %) | $Al_2O_3$ | | 96.5 | 96.4 | 96.8 | 96.6 | 96.4 |
| | | C | | 3.2 | 3.3 | 2.9 | 3.1 | 3.3 |
| | Slaking resistance | | | x | x | x | x | x |
| | Mineral phase (mass %) | $Al_4O_4C$ | | 57.6 | 59.4 | 52.2 | 55.8 | 59.4 |
| | | Corundum | | 42.4 | 40.6 | 47.8 | 44.2 | 40.6 |

TABLE 3

| | Name | Particle size | Mean particle diameter | Comparative sample 9 | Inventive sample 9 | Inventive sample 10 | Inventive sample 11 | Inventive sample 12 |
|---|---|---|---|---|---|---|---|---|
| Raw material | Calcinated alumina | | 50 μm | 95 | 89.5 | 86 | 85 | 80 |
| | Flaky graphite | 100 mesh or more | 0.2 mm | 5 | 10.5 | 14 | 15 | 17 |
| | Mol ratio($C/Al_2O_3$) | | | 0.4 | 1.0 | 1.4 | 1.5 | 1.8 |
| Composition produced after melting in arc furnace | | | | | | | | |
| | Apparent specific gravity | | | 3.70 | 3.20 | 2.99 | 2.81 | 2.66 |
| | Apparent porosity (%) | | | 3.9 | 3.5 | 3.1 | 2.3 | 1.9 |
| | Chemical composition (mass %) | $Al_2O_3$ | | 98.9 | 96.5 | 95.5 | 94.9 | 94.3 |
| | | C | | 0.8 | 3.2 | 4.2 | 4.8 | 5.4 |
| | Slaking resistance | | | ○ | ○ | ○ | ○ | ○ |
| | Mineral phase (mass %) | $Al_4O_4C$ | | 14.4 | 57.8 | 75.6 | 86.4 | 97.2 |
| | | Corundum | | 85.6 | 42.2 | 24.4 | 13.6 | 2.8 |

TABLE 4

| | Name | Particle size | Mean particle diameter | Inventive sample 13 | Inventive sample 14 | Inventive sample 15 | Inventive sample 16 | Inventive sample 17 | Inventive sample 7 | Inventive sample 18 |
|---|---|---|---|---|---|---|---|---|---|---|
| Raw material | Calcinated alumina | | 50 μm | 85 | 85 | 85 | 85 | 85 | | |
| | Fused alumina | 100 mesh or less | 60 μm | | | | | | 85 | 85 |
| | Flaky graphite | 100 mesh or less | 0.2 mm | 15 | | | | | 15 | 15 |
| | Pitch | 100 mesh or less | 50 μm | | 15 | | | | | |
| | Carbon black | 325 mesh or less | 0.5 μm | | | 15 | | | | |

TABLE 4-continued

| Name | Particle size | Mean particle diameter | Inventive sample 13 | Inventive sample 14 | Inventive sample 15 | Inventive sample 16 | Inventive sample 17 | Inventive sample 7 | Inventive sample 18 |
|---|---|---|---|---|---|---|---|---|---|
| Artificial graphite | 200 mesh or less | 60 μm | | | | 15 | | | |
| Earthy graphite | 325 mesh or less | 3 μm | | | | | 15 | | |
| Composition ion produced after melting in arc furnace | | | | | | | | | |
| Apparent specific gravity | | | 2.85 | 2.93 | 3.16 | 2.61 | 2.68 | 2.99 | 2.93 |
| Apparent porosity (%) | | | 2.3 | 2.2 | 2.9 | 2.5 | 2.1 | 2.3 | 2.6 |
| Chemical composition (mass %) | $Al_2O_3$ | | 94.9 | 95.5 | 96.9 | 95 | 95.1 | 94.9 | 94.5 |
| | C | | 4.8 | 4.2 | 2.8 | 4.7 | 4.6 | 4.8 | 5.2 |
| Slaking resistance | | | ○ | ○ | ○ | ○ | ○ | ○ | ○ |
| Mineral phase (mass %) | $Al_4O_4C$ | | 86.4 | 75.6 | 50.4 | 84.6 | 82.8 | 86.4 | 93.6 |
| | Corundum | | 13.5 | 24.4 | 49.6 | 15.4 | 17.2 | 13.6 | 6.4 |

What is claimed is:

1. A method of producing an aluminum oxycarbide composition, comprising:
preparing a blend substantially consisting of a carbon- raw material having a mean particle diameter of 0.5 mm or less and an alumina- raw material having a mean particle diameter of 350 μm or less, wherein a mole ratio of the carbon- raw material to the alumina- raw material ($C/Al_2O_3$) is in a range of 0.8 to 2.0; homogeneously mixing the blend to allow a variation in C component to fall within ±10%; and melting the obtained mixture in an arc furnace at 1850° C. or more.

2. The method as defined in claim 1, wherein the mean particle diameter of the carbon- raw material is in a range of 0.5 μm to 0.5 mm, and the mean particle diameter of the alumina- raw material is in a range of 0.5 μm to 350 μm.

3. The method as defined in claim 1, wherein the mole ratio of the carbon- raw material to the alumina- raw material ($C/Al_2O_3$) is in a range of 1.0 to 1.8.

4. An aluminum oxycarbide composition produced using an arc furnace, which has a chemical composition consisting of: 95 mass % or more of a total of C and $Al_2O_3$; 45 mass % or more of $Al_4O_4C$ as a mineral phase; and 10 mass % or less of other mineral phase, with the remainder being corundum, the aluminum oxycarbide composition having a degradation rate of 3 mass % or less as measured in a magnesia clinker slaking test according to the Gakushin-method 4.

5. The aluminum oxycarbide composition as defined in claim 4, which has an apparent porosity of 3.5% or less.

6. The aluminum oxycarbide composition as defined in claim 4, which has an apparent specific gravity of 3.20 or less, wherein C as the chemical component is contained in an amount of 2.5 to 5.5 mass %.

7. The aluminum oxycarbide composition as defined in claim 4, which is used for a carbon-containing refractory material.

8. The method as defined in claim 2, wherein the mole ratio of the carbon- raw material to the alumina- raw material ($C/Al_2O_3$) is in a range of 1.0 to 1.8.

9. The aluminum oxycarbide composition as defined in claim 5, which has an apparent specific gravity of 3.20 or less, wherein C as the chemical component is contained in an amount of 2.5 to 5.5 mass %.

10. The aluminum oxycarbide composition as defined in claim 9, which is used for a carbon-containing refractory material.

11. The aluminum oxycarbide composition as defined in claim 5, which is used for a carbon-containing refractory material.

12. The aluminum oxycarbide composition as defined in claim 6, which is used for a carbon-containing refractory material.

* * * * *

UNITED STATES PATENT AND TRADEMARK OFFICE
CERTIFICATE OF CORRECTION

PATENT NO. : 8,465,720 B2 Page 1 of 1
APPLICATION NO. : 13/262133
DATED : June 18, 2013
INVENTOR(S) : Akamine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 159 days.

Signed and Sealed this
Eighth Day of September, 2015

Michelle K. Lee
*Director of the United States Patent and Trademark Office*